United States Patent
Wu et al.

(10) Patent No.: US 11,601,902 B2
(45) Date of Patent: Mar. 7, 2023

(54) SYNCHRONIZATION SIGNAL BLOCK TRANSMISSION METHOD, NETWORK DEVICE, AND TERMINAL

(71) Applicant: VIVO MOBILE COMMUNICATION CO., LTD., Chang'an Dongguan (CN)

(72) Inventors: Kai Wu, Chang'an Dongguan (CN); Siqi Liu, Chang'an Dongguan (CN); Xueming Pan, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/106,429

(22) Filed: Nov. 30, 2020

(65) Prior Publication Data
US 2021/0084605 A1    Mar. 18, 2021

Related U.S. Application Data

(63) Continuation of application No. PCT/CN2019/091213, filed on Jun. 14, 2019.

(30) Foreign Application Priority Data

Jun. 14, 2018 (CN) .................. 201810613541.X

(51) Int. Cl.
*H04W 56/00*   (2009.01)
*H04L 1/00*    (2006.01)
(Continued)

(52) U.S. Cl.
CPC ......... *H04W 56/001* (2013.01); *H04L 5/0007* (2013.01); *H04L 5/0053* (2013.01); *H04L 5/023* (2013.01); *H04W 72/042* (2013.01)

(58) Field of Classification Search
CPC .............. H04W 56/001; H04W 56/00; H04W 72/0446; H04W 72/042; H04L 5/0007; H04L 5/0053; H04L 5/0094
See application file for complete search history.

(56) References Cited

U.S. PATENT DOCUMENTS 7,417,971 B2 * 8/2008 Jeong ................ H04W 52/0216
                                                         455/450
9,392,587 B2    7/2016 Yang et al.
(Continued)

FOREIGN PATENT DOCUMENTS

CN    104349464    *   2/2015   ............ H04W 72/04
CN    104349464 A      2/2015
(Continued)

OTHER PUBLICATIONS

3GPP TSG RAN WG1, Meeting #93, R1-1805920, (May 21-May 25, 2018) (Year: 2018).*

(Continued)

*Primary Examiner* — Diane L Lo
*Assistant Examiner* — Abusayeed M Haque
(74) *Attorney, Agent, or Firm* — von Briesen & Roper, s.c.

(57) ABSTRACT

A synchronization signal block transmission method, a network device, and a terminal are provided. The method includes: determining a target time domain transmission location of a first synchronization signal block within a downlink signal transmitting time, where the target time domain transmission location is one of at least two candidate time domain transmission locations of the first synchronization signal block; and transmitting the first synchronization signal block in the target time domain transmission location.

20 Claims, 8 Drawing Sheets

(51) Int. Cl.
    *H04W 72/04*    (2009.01)
    *H04L 5/00*     (2006.01)
    *H04L 5/02*     (2006.01)

(56)            References Cited

U.S. PATENT DOCUMENTS

| | | | | |
|---|---|---|---|---|
| 9,545,995 | B1* | 1/2017 | Chau | G05D 1/0022 |
| 2007/0014269 | A1* | 1/2007 | Sherman | H04W 48/12 |
| | | | | 370/338 |
| 2012/0188125 | A1* | 7/2012 | Pomietlasz | G01S 13/87 |
| | | | | 342/357.68 |
| 2015/0327202 | A1* | 11/2015 | Xu | H04L 5/1469 |
| | | | | 370/280 |
| 2016/0097837 | A1* | 4/2016 | Richley | G01S 5/0244 |
| | | | | 342/465 |
| 2019/0223155 | A1 | 7/2019 | Lu et al. | |
| 2020/0389860 | A1 | 12/2020 | Tang | |

FOREIGN PATENT DOCUMENTS

| | | | | |
|---|---|---|---|---|
| CN | 106488540 | * | 3/2017 | ........... H04L 5/1469 |
| CN | 107548146 A | | 1/2018 | |
| CN | 107959646 A | | 4/2018 | |
| CN | 108134657 U | | 6/2018 | |
| JP | 6972172 | * | 5/2017 | ........... H04L 5/0053 |
| JP | 2020520572 | * | 5/2017 | ........... H04W 24/00 |
| JP | 2021513760 A | | 5/2021 | |
| WO | 2014141255 A1 | | 9/2014 | |
| WO | WO-2018228789 A1 | * | 12/2018 | ........... H04B 7/0695 |
| WO | WO-2019127495 A1 | * | 7/2019 | ........... H04B 7/0695 |
| WO | WO-2019218134 A1 | * | 11/2019 | ........... H04W 72/04 |

OTHER PUBLICATIONS

Extended European Search Report for related Application No. 19818845.0; dated Jun. 17, 2021.

3rd Generation Partnership Project, "Technical Specification Group Radio Access Network; NR; Physical layer procedures for control", Mar. 2018, 3GPP TS 38.213 V15.1.0, Valbonne, France.
Huawei, Hisilicon, "Initial access in NR unlicensed", May 21-25, 2018, 3GPP TSG RAN WG1 Meeting #93, Busan, Korea.
Oppo, "Discussion on Impact of LBT to Minimum System Information for NR-U", May 21-25, 2018, 3GPP TSG-RAN2 Meeting #102, Busan, Korea.
International Search Report & Written Opinion related to Application No. PCT/CN2019/091213; dated Dec. 24, 2020.
Chinese Office Action for related Application No. 201810613541.X; dated Sep. 4, 2020.
Nokia, "Way forward on the mapping of SS blocks", Jun. 27-30, 2017, 3GPP TSG RAN WG1 Meeting NR adhoc#2, Qingdao, China.
Vivo, "Discussion on remaining details on synchronization signal", Nov. 27-Dec. 1, 2017, 3GPP TSG RAN WG1 Meeting #91, Reno, USA.
Ericsson, "SS burst set periodicity for NR", Jun. 27-29, 2017, 3GPP TSG-RAN WG4 Meeting #NR-AH-02, Qingdao, China.
Intel Corporation, "On MGRP and MGL for NR", Oct. 9-13, 2017, 3GPP TSG-RAN4 Meeting #84bis, Dubrovnik, Croatia.
Indian Examination Report for related Application No. 202127000625; dated Jan. 5, 2022.
Japanese Notice of Reasons for Refusal for related Application No. 2020-568400; dated Jan. 26, 2022.
Zte, "Considerations on DL reference signals and channels design for NR-U", May 21-25, 2018, 3GPP TSG RAN WG1 Meeting #93, Busan, Korea, R1-1806460.
Sony, "Considerations on DL Signals and Channels for NR unlicensed operation", May 21-25, 2018, 3GPP TSG RAN WG1 Meeting #93, Busan Korea, R1-1806568.
Mediatek Inc., "Considerations on initial access and mobility for NR-U", May 21-25, 2018, 3GPP TSG RAN WG1 Meeting #93, Busan, Korea, R1-1806798.
Apple Inc., "NR Unlicensed Physical Channel Design Considerations", May 21-25, 2018, 3GPP TSG RAN WG1 Meeting #93, Busan, Korea, R1-1807002.

* cited by examiner

SYNCHRONIZATION SIGNAL BLOCK TRANSMISSION METHOD, NETWORK DEVICE, AND TERMINAL

CROSS-REFERENCE TO RELATED APPLICATIONS

This application is a continuation of PCT Application No. PCT/CN2019/091213 filed on Jun. 14, 2019, which claims priority to Chinese Patent Application No. 201810613541.X filed in China on Jun. 14, 2018, which are incorporated herein by reference in their entireties.

TECHNICAL FIELD

This disclosure relates to the field of communications technologies, and in particular, to a synchronization signal block transmission method, a network device, and a terminal.

BACKGROUND

In the fifth generation (5G) mobile communications system, also known as new radio (NR) system, a network device needs to transmit a synchronization signal and PBCH block (SSB) for a terminal to perform synchronization, system information acquisition, measurement, and the like. A plurality of SSBs are combined into an SS burst set, a maximum quantity of SSBs contained in an SS burst set is relevant to a carrier frequency used by the system:

when the frequency is below 3 GHz, a maximum of 4 SSBs can be contained in an SS burst set;

when the carrier frequency ranges from 3 GHz to 6 GHz, a maximum of 8 SSBs can be contained in an SS burst set;

when the carrier frequency is above 6 GHz, a maximum of 64 SSBs can be contained in an SS burst set.

No matter how many SSBs are contained in an SS burst set, it needs to be sent out within a time window of 5 ms.

An NR system supports different numerologies (Numerology), a different numerology corresponds to a different signal subcarrier spacing, and an SSB symbol and another symbol may use different numerologies and be multiplexed. The another symbol refers to a symbol that may be multiplexed with the SSB symbol, such as a symbol in which uplink control is located, a symbol in which downlink control is located, a symbol in which a guard interval is located, a symbol for data transmission, and the like. Under different numerologies, a possible location of an SSB within one slot is different, and a location of a slot in which the SSB is located within the 5 ms transmitting window may also be different.

In a licensed-assisted access (LAA) scenario, or known as an unlicensed frequency band transmission scenario, of the NR system, before transmitting information, a transmit node (a base station or a terminal) needs to listen to channels by performing clear channel access (CCA)/extended clear channel access (eCCA), that is, energy detection (ED). Transmission can be started only when the energy is lower than a specific threshold and a channel is determined to be idle. Because an unlicensed frequency band is shared by a plurality of technologies, this contention-based access mode causes uncertainty in determining when a channel is available. In a licensed frequency band transmission scenario of the NR system, a location of each SSB in a half radio frame of 5 ms is fixed. While in an unlicensed frequency band transmission scenario, a network device needs to listen within a corresponding frequency range. A channel may be not idle within a specific time period, leading to failure to perform downlink transmission in a subsequent time period. As a result, possible transmission locations of some SSBs may have been missed out, making these SSBs unable to be sent.

SUMMARY

Embodiments of this disclosure provide a synchronization signal block transmission method, a network device, and a terminal.

According to a first aspect, an embodiment of this disclosure provides a synchronization signal block transmission method applied to a network device side, including:

determining a target time domain transmission location of a first synchronization signal block within a downlink signal transmitting time, where the target time domain transmission location is one of at least two candidate time domain transmission locations of the first synchronization signal block; and transmitting the first synchronization signal block in the target time domain transmission location.

According to a second aspect, an embodiment of this disclosure further provides a network device, including:

a first processing module, configured to determine a target time domain transmission location of a first synchronization signal block within a downlink signal transmitting time, where the target time domain transmission location is one of at least two candidate time domain transmission locations of the first synchronization signal block; and a transmitting module, configured to transmit the first synchronization signal block in the target time domain transmission location.

According to a third aspect, an embodiment of this disclosure provides a network device, where the network device includes a processor, a memory, and a computer program stored in the memory and capable of running on the processor; and when the processor executes the computer program, the steps of the foregoing synchronization signal block transmission method are implemented.

According to a fourth aspect, an embodiment of this disclosure provides a synchronization signal block transmission method applied to a terminal side, including:

receiving a first synchronization signal block, where the first synchronization signal block carries indication information used to indicate a target time domain transmission location; and determining the target time domain transmission location of the first synchronization signal block based on the indication information, where the target time domain transmission location is one of at least two candidate time domain transmission locations of the first synchronization signal block.

According to a fifth aspect, an embodiment of this disclosure provides a terminal, including:

a receiving module, configured to receive a first synchronization signal block, where the first synchronization signal block carries indication information used to indicate a target time domain transmission location; and a second processing module, configured to determine the target time domain transmission location of the first synchronization signal block based on the indication information, where the target time domain transmission location is one of at least two candidate time domain transmission locations of the first synchronization signal block.

According to a sixth aspect, an embodiment of this disclosure provides a terminal, where the terminal includes a processor, a memory, and a computer program stored in the memory and capable of running on the processor; and when the computer program is executed by the processor, the steps of the foregoing synchronization signal block transmission method are implemented.

According to a seventh aspect, an embodiment of this disclosure provides a computer-readable storage medium, where the computer-readable storage medium stores a computer program, and when the computer program is executed by a processor, the steps of the synchronization signal block transmission method of the foregoing network device are implemented, or the steps of the synchronization signal block transmission method of the foregoing terminal are implemented.

In this way, the embodiments of this disclosure can ensure that a synchronization signal block is sent flexibly at different time points within a time period, avoiding the problem that a synchronization signal block cannot be sent due to missing out a transmitting time of the synchronization signal block, thereby improving effectiveness of communication.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings.

DESCRIPTION OF EMBODIMENTS

Figure 1:
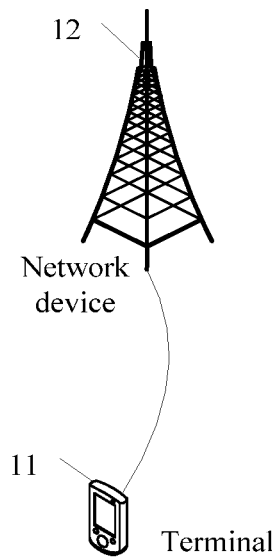
FIG. 1 is a structural block diagram of a mobile communication system applicable to an embodiment of this disclosure.

The following describes example embodiments of this disclosure in more detail with reference to the accompanying drawings. Although the example embodiments of this disclosure are shown in the accompanying drawings, it should be understood that this disclosure may be implemented in various forms and should not be limited by the embodiments set forth herein. Instead, the embodiments are provided to enable a more thorough understanding of this disclosure and convey the scope of this disclosure to a person skilled in the art.

The terms "first", "second", and the like in this specification and claims of this application are used to distinguish between similar objects instead of describing a specific order or sequence. It should be understood that the data used in this way is interchangeable in appropriate circumstances so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device. Use of "and/or" in the specification and claims represents at least one of connected objects.

The technologies described herein are not limited to long term evolution (LTE)/LTE-advanced (LTE-A) systems, but are also applicable to various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are often used interchangeably. The CDMA system may implement radio technologies such as CDMA2000 and universal terrestrial radio access (UTRA). UTRA includes wideband code division multiple access (WCDMA) and other CDMA variants. The TDMA system may implement radio technologies such as the global system for mobile communication (GSM). The OFDMA system may implement radio technologies such as ultra mobile broadband (UMB), evolution-UTRA (E-UTRA), IEEE 802.11 (Wi-Fi), IEEE 802.16 (WiMAX), IEEE 802.20, and Flash-OFDM. UTRA and E-UTRA are part of the universal mobile telecommunications system (UMTS). LTE and more advanced LTE technologies (such as LTE-A) are new UMTS versions using E-UTRA. UTRA, E-UTRA, UMTS, LTE, LTE-A, and GSM are described in documents from the organization named "3rd generation partnership project" (3GPP). CDMA2000 and UMB are described in documents from the organization named "3rd generation partnership project 2" (3GPP2). The technologies described herein are applicable not only to the above-mentioned systems and radio technologies, but also to other systems and radio technologies. However, the following description describes an NR system for the purpose of illustration, and uses NR terminology in most of the following description by taking the NR system as an example for description, although these technologies are also applicable to other applications than the NR system applications. Persons skilled in the art can understand that the wording does not constitute any limitation on the protection scope of this disclosure.

Examples provided in the following description are not intended to limit the scope, applicability, or configuration described in the claims. The functions and arrangements of the discussed elements may be changed without departing from the spirit and scope of this disclosure. Various procedures or components may be omitted, replaced, or added properly in various examples. For example, the described method may be performed in an order different from the described order, and steps may be added, omitted, or combined. In addition, features described with reference to some examples may be combined in other examples.

FIG. 1 is a structural block diagram of a wireless communications system applicable to an embodiment of this disclosure. The wireless communications system includes a terminal 11 and a network device 12. The terminal 11 may also be referred to as a terminal device or user equipment (UE). The terminal 11 may be a terminal side device such as a mobile phone, a tablet computer (tablet personal computer), a laptop computer, a personal digital assistant (PDA), a mobile internet device (MID), a wearable device, or an in-vehicle device. It should be noted that the specific type of the terminal 11 is not limited in the embodiments of this disclosure. The network device 12 may be a base station or a core network, where the base station may be a base station of 5G or a later version (for example, gNB or 5G NR NB), or a base station in other communications systems (for example, an eNB, a WLAN access point, or another access points). The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a Wi-Fi node, or some other appropriate term in the art. As long as the same technical effects are achieved, the base station is not limited to any specific technical term. It should be noted that the base station in the NR system is taken only as an example in the embodiments of this disclosure, but a specific type of the base station is not limited.

The base station may communicate with the terminal 11 under the control of a base station controller. In various examples, the base station controller may be a part of the core network or some base stations. Some base stations may exchange control information or user data with the core network through backhaul. In some examples, some of these base stations may communicate with each other directly or indirectly through backhaul links that may be wired or wireless communication links. The wireless communications system may support operations on a plurality of carriers (waveform signals of different frequencies). A multi-carrier transmitter may transmit modulated signals simultaneously on the plurality of carriers. For example, each communication link may be used to transmit a multi-carrier signal modulated according to various radio technologies. Each modulated signal may be sent on a different carrier and may carry control information (for example, a reference signal or a control channel), overhead information, data, and the like.

The base station may communicate wirelessly with the terminal 11 through one or more access point antennas. Each base station may provide communication coverage for its respective coverage area. A coverage area of an access point may be divided into sectors each of which is only a part of the coverage area. The wireless communications system may include different types of base stations (for example, macrocell base stations, microcell base stations, and picocell base stations). The base station may also use different radio technologies, such as cellular and WLAN radio access technologies. The base station may be associated with nodes of the same or different access networks or operators. Coverage areas of different base stations (including coverage areas of the same or different types of base stations, coverage areas utilizing the same or different radio technologies, or coverage areas in the same or different access networks) may overlap.

Communication links in the wireless communications system may include an uplink for carrying uplink (UL) transmission (for example, from the terminal 11 to the network device 12), or a downlink for carrying downlink (DL) transmission (for example, from the network device 12 to the terminal 11). The UL transmission may also be referred to as reverse link transmission, while the DL transmission may also be referred to as forward link transmission. The downlink transmission may be performed by using a licensed frequency band, an unlicensed frequency band, or both. Similarly, the uplink transmission may be performed by using a licensed frequency band, an unlicensed frequency band, or both.

Figure 2:
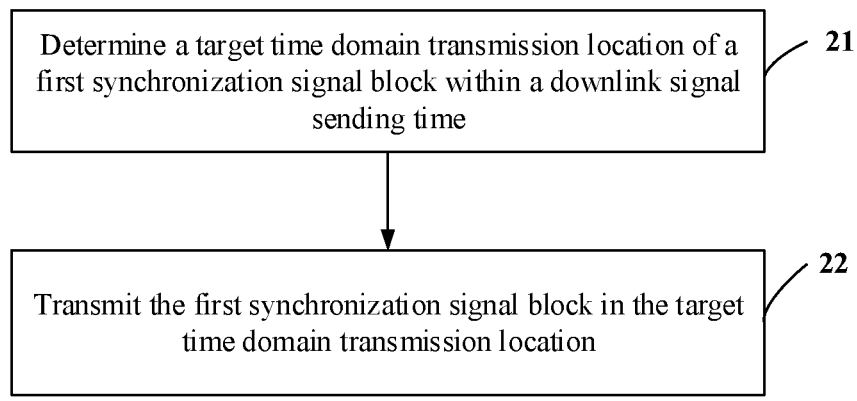
FIG. 2 is a schematic flowchart of a synchronization signal block transmission method on a network device side provided in an embodiment of this disclosure.

An embodiment of this disclosure provides a synchronization signal block transmission method, applied to a network device side. As shown in FIG. 2, the method includes the following steps.

Step 21: Determine a target time domain transmission location of a first synchronization signal block within a downlink signal transmitting time.

Each synchronization signal block corresponds to a synchronization signal block index (SSB index), an SSB index of the first synchronization signal block is a first value, and the first value is one of the SSB indexes. It should be noted that the first synchronization signal block herein is not limited to a synchronization signal block of a specific SSB index. For example, there are eight synchronization signal blocks SSB0 to SSB7, and the first synchronization signal block may be any one of these eight blocks.

Further, the target time domain transmission location is one of at least two candidate time domain transmission locations of the first synchronization signal block. The first synchronization signal block has at least two candidate time domain transmission locations. In other words, a synchronization signal block of each SSB index may have at least two candidate time domain transmission locations, such as N locations. A quantity of candidate time domain transmission locations of synchronization signal blocks of different SSB indexes may be the same or may be different, but the quantity N of candidate time domain transmission locations of synchronization signal blocks of each SSB index may not exceed a maximum quantity L of SSBs that can be transmitted by an SS burst set on a current operating frequency band. For example, when the carrier frequency is below 3 GHz, a maximum of L=4 SSBs may be transmitted in one SS burst set; when the carrier frequency ranges from 3 GHz to 6 GHz, a maximum of L=8 SSBs may be transmitted in one SS burst set; when the carrier frequency is above 6 GHz, a maximum of L=64 SSBs may be transmitted in one SS burst set.

Within a downlink signal transmitting time, the network device selects one from the at least two candidate time domain transmission locations as the target time domain transmission location of the first synchronization signal block. Since there are a plurality of candidate time domain transmission locations available for selection, transmitting of the synchronization signal block is more flexible.

Step 22: Transmit the first synchronization signal block in the target time domain transmission location.

After the target time domain transmission location of the first synchronization signal block is determined, the first synchronization signal block is sent in the transmission location. The first synchronization signal block may have at least one of the following functions: used for initial timing synchronization; used for measurement for wireless link detection, beam failure detection, and radio resource management, including reference signal received power (RSRP), reference signal received quality (RSRQ), a signal to interference plus noise ratio (SINR), a received signal strength indicator (RSSI), and the like reported to level 3 (L3); used for measurement and reporting of the RSRP at level 1 (L1); used as a reference for a time-frequency resource location for transmitting a random access message 1 (MSG1); and used as a reference for uplink transmit power control, for example, the terminal determines the uplink transmit power based on the received SSB power.

The candidate time domain transmission locations of the first synchronization signal block in this embodiment of this disclosure include but are not limited to: a default time domain transmission location, and at least one extra time domain transmission location. The default time domain transmission location is the same as a time domain transmission location of the first synchronization signal block on a licensed frequency band. For a frequency band above 6 GHz, an NR system supports a subcarrier spacing of 60/120/240 kHz; for a frequency band below 6 GHz, the NR system supports a subcarrier spacing of 15/30/60 kHz. SSBs may be transmitted when the subcarrier spacing is 15/30/60/120/240 kHz. Data may be transmitted when the subcarrier spacing is 15/30/60/120 kHz, but data cannot be transmitted when the subcarrier spacing is 240 kHz.

On a licensed frequency band, for an SSB transmitted in a half frame (5 ms), a symbol index of the first orthogonal frequency division multiplexing (OFDM) symbol of the SSB is related to a subcarrier spacing of the SSB. Herein, an OFDM symbol numbered 0 is the first OFDM symbol of the first slot in the 5 ms half frame. Transmitting locations of SSBs are as follows:

CASE A: For a 15 kHz subcarrier spacing, the symbol number of the first OFDM symbol transmitting the SSB is $\{2, 8\}+14*n$. When a carrier frequency is below or equal to 3 GHz, n=0 or 1; when the carrier frequency is above 3 GHz, but below or equal to 6 GHz, n=0, 1, 2 or 3.

CASE B: For a 30 kHz subcarrier spacing, the symbol number of the first OFDM symbol transmitting the SSB is $\{4, 8, 16, 20\}+28*n$. When the carrier frequency is below or equal to 3 GHz, n=0; when the carrier frequency is above 3 GHz, but below or equal to 6 GHz, n=0 or 1.

CASE C: For a 30 kHz subcarrier spacing, the symbol number of the first OFDM symbol transmitting the SSB is $\{2, 8\}+14*n$. When a carrier frequency is below or equal to 3 GHz, n=0 or 1; when the carrier frequency is above 3 GHz, but below or equal to 6 GHz, n=0, 1, 2 or 3.

CASE D: For a 120 kHz subcarrier spacing, the symbol number of the first OFDM symbol transmitting the SSB is $\{4, 8, 16, 20\}+28*n$. When the carrier frequency is above 6 GHz, n=0, 1, 2, 3, 5, 6, 7, 8, 10, 11, 12, 13, 15, 16, 17 or 18.

CASE E: For a 240 kHz subcarrier spacing, the symbol number of the first OFDM symbol transmitting the SSB is $\{8, 12, 16, 20, 32, 36, 40, 44\}+56*n$. When the carrier frequency is above 6 GHz, n=0, 1, 2, 3, 5, 6, 7 or 8.

It should be noted that in the 5 ms half frame, the SSB index is always numbered from 0 to L−1 in ascending order of time. The default time domain transmission location of the first synchronization signal block is the same as the time domain transmission location of the first synchronization signal block in the foregoing scenario. For example, if the carrier frequency is below or equal to 3 GHz, the subcarrier spacing is 15 kHz, and the first synchronization signal block is SSB0, the first OFDM symbol of the default time domain transmission location of the first synchronization signal block is 2.

Further, the extra time domain transmission location is a time domain transmission location used for transmitting the synchronization signal block other than the default time domain transmission location. In other words, in a 5 ms half frame, it is defined that the SSB of each SSB index may have N (N⇐L) transmitting locations, and a time domain transmission location of the SSB defined on a licensed frequency band is determined as the default time domain transmission location. The newly added extra time domain transmission locations may be set by referring, without limitation, to the following methods:

Method 1: A default time domain transmission locations of another SSB index may be reused as the extra time domain transmission location of the first synchronization signal block. For example, the extra time domain transmission location is at least one of default time domain transmission locations of other synchronization signal blocks within a group that the first synchronization signal block belongs to, where the group includes at least two synchronization signal blocks with different index numbers. Quantities of synchronization signal blocks contained in different groups may be same or different, which is not specially limited in the embodiments of this disclosure. Grouping is performed based on the SSB index. The default time domain transmission location of another SSB within the same group is the extra time domain transmission location of the first synchronization signal block.

Figure 3:
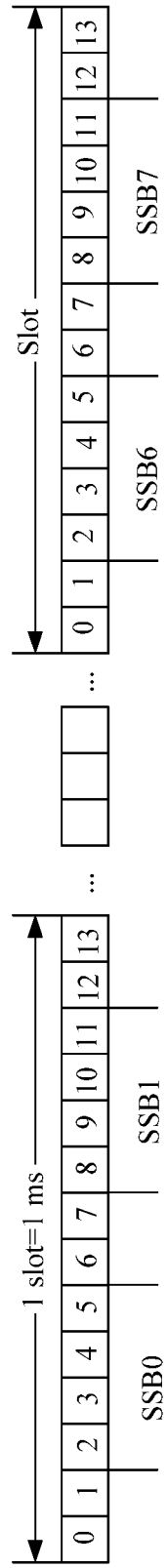
FIG. 3 is a schematic diagram 1 of resource mapping of a default time domain transmission location of a synchronization signal block in an embodiment of this disclosure.
Figure 4:
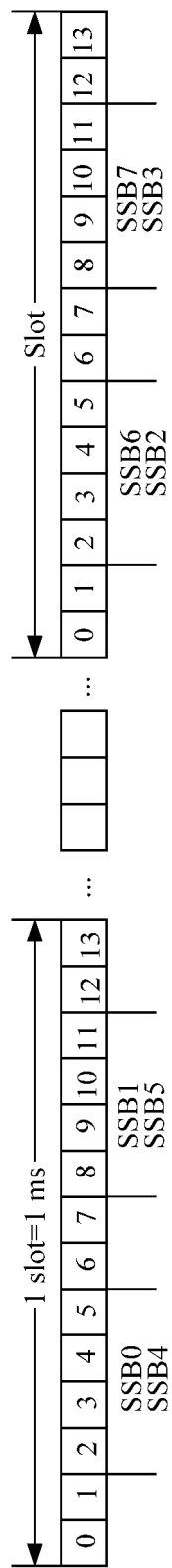
FIG. 4 is a schematic diagram of resource mapping of candidate time domain transmission locations of a synchronization signal block in Embodiment 1 of this disclosure.

It is assumed that the system operates on the frequency band of 3 to 6 GHz, and supports the transmission of up to L=8 SSBs at a subcarrier spacing of 15 kHz, default time domain transmission locations of these eight SSBs are shown in FIG. 3. These eight SSBs are divided into four groups, such as {0, 4}, {1, 5}, {2, 6}, and {3, 7}, that is, the SSBs with a same result of mod(SSB index, 4) are divided into one group. An SSB within the group may be sent in an OFDM symbol location of another SSB with a corresponding number. For example, as shown in FIG. 4, the SSB with an SSB index=0 may be sent on the SSB with an SSB index=4, the SSB with an SSB index=1 may be sent on the SSB with an SSB index=5, the SSB with an SSB index=2 may be sent on the SSB with an SSB index=6, and the SSB with an SSB index=3 may be sent on the SSB with an SSB index=7. In this way, in an unlicensed frequency band transmission scenario, if the network device detects that a channel in which the default time domain transmission location of the first synchronization signal block is located is unavailable for downlink transmitting, the network device may select to transmit the first synchronization signal block in another extra time domain transmission location, for example, SSB0 may be transmitted in the transmission location of SSB4.

Method 2: The extra time domain transmission locations may be the time domain transmission locations other than the default time domain transmission locations of all SSB indexes. In other words, the extra time domain transmission location is one of the time domain transmission locations other than the default time domain transmission locations of all synchronization signal blocks.

Figure 5:
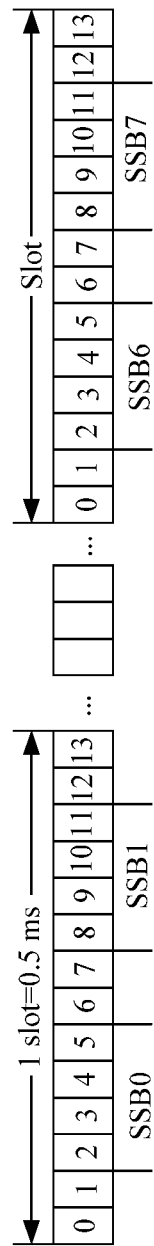
FIG. 5 is a schematic diagram 2 of resource mapping of a default time domain transmission location of a synchronization signal block in an embodiment of this disclosure.

It is assumed that the system operates on the frequency band of 3 to 6 GHz, and supports the transmission of up to L=8 SSBs at a subcarrier spacing of 30 kHz, default time domain transmission locations of these eight SSBs are shown in FIG. 5. These eight SSBs may be sent out within four slots, that is, transmitting of all SSBs is completed within 2 ms. Then, in the 5 ms half frame, there are still other resources available for transmitting SSBs, and the extra time domain transmission locations may be selected in the rest 3 ms. It may be defined that starting from the fifth slot (which is slot 4 if the slot number starts from 0) (that is, starting from 2 ms), the extra time domain transmission locations of the synchronization signal blocks of different SSB indexes are set in turn. For example, the default time domain transmission locations of these eight SSBs are repeated once, that is, {2, 8}+14*n+14*5 is additionally defined as a number of a starting OFDM symbol that can transmit these SSBs. The SSB locations starting from the fifth slot correspond to the SSBs numbered 0 to 7 in ascending order of time. In this way, in an unlicensed frequency band transmission scenario, if the network device detects that the channel in which the default time domain transmission location of the first synchronization signal block is located is unavailable for downlink transmitting, the network device may select to transmit the first synchronization signal block in the OFDM symbol locations starting from {2, 8}+14*n+14*5. Alternatively, it may be defined that starting from the sixth slot (which is slot 5 if the slot number starts from 0) (that is, starting from 2.5 ms), the extra time domain transmission locations of the synchronization signal blocks of different SSB indexes are set in turn. For example, the default time domain transmission locations of these eight SSBs are repeated once, that is, {2, 8}+14*n+14*6 is defined as a number of a starting OFDM symbol that can transmit the SSBs. The SSB locations starting from the sixth slot correspond to the SSBs numbered 0 to 7 in ascending order of time. In this way, in an unlicensed frequency band transmission scenario, if the network device detects that the channel in which the default time domain transmission location of the first synchronization signal block is located is unavailable for downlink transmitting, the network device may select to transmit the first synchronization signal block in the OFDM symbol locations starting from {2, 8}+14*n+14*6.

Method 3: Within a period for a synchronization signal block transmission, all of the default time domain transmission locations of the first synchronization signal block within different SS burst sets (from a starting location of each 10 ms frame, or a duration of 5 ms starting from a starting location of a 5 ms half frame) are determined as the candidate time domain transmission locations of the first synchronization signal block. In this manner, the network device may transmit in one SS burst set only part of to-be-sent SSBs indicated by system information or radio resource control (RRC) signaling, that is, it is not required that all to-be-sent SSBs be sent out within a 5 ms window.

The step 21 is: determining the target time domain transmission location of the first synchronization signal block within a channel occupancy time if an idle channel is detected within the period for the synchronization signal block transmission, where the transmitting period of the first synchronization signal block is N×5 ms, N is a positive integer greater than 1, and the channel occupancy time herein is less than or equal to MCOT. It should be noted that since N SS burst sets are included within the period for the synchronization signal block transmission, the network device may complete the transmitting of the first synchronization signal block in any one of these N SS burst sets. In other words, an idle channel may be detected many times within the period for the synchronization signal block transmission, so the network device determines a target time domain transmission location of the first synchronization signal block within the channel occupancy time based on the many detection results.

Figure 6:
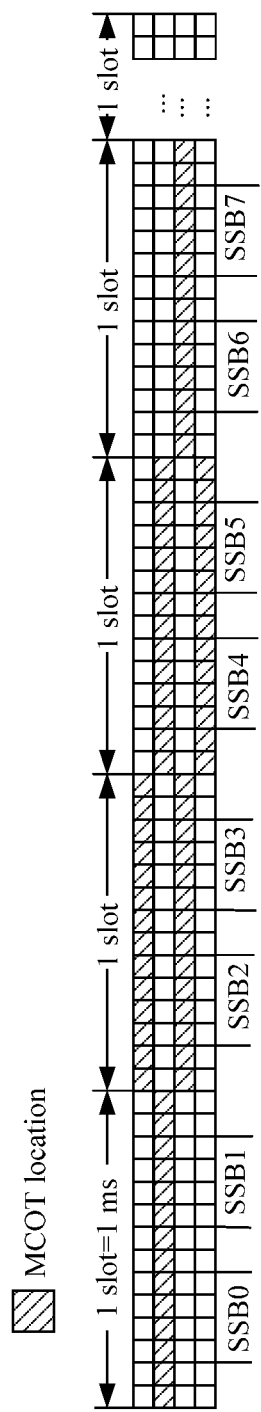
FIG. 6 is a schematic diagram of resource mapping of candidate time domain transmission locations of a synchronization signal block in Embodiment 2 of this disclosure.

It is assumed that the system operates on the frequency band of 3 to 6 GHz, and supports the transmission of up to L=8 SSBs at a subcarrier spacing of 15 kHz, the corresponding default time domain transmission locations of these eight SSBs are shown in FIG. 3, where N=4, that is, the period for the synchronization signal block transmission is set to 20 ms, including four SS burst sets of 5 ms each, and including 20 slots. If the network device needs to transmit five SSBs numbered 1, 2, 3, 4 and 7, the network device may transmit the SSBs in any one of these four SS burst sets. It is assumed that MCOT is 1 ms. As shown in FIG. 6, the network device occupies the second, the sixth, the eighth, the twelfth, the fourteenth, and the eighteenth slots in the 20 ms according to the detection result, where transmission locations of SSB2 and SSB3 are included in the second slot, transmission locations of SSB0 and SSB1 are included in the sixth slot, transmission locations of SSB4 and SSB5 are included in the eighth slot, transmission locations of SSB2 and SSB3 are included in the twelfth slot, transmission locations of SSB6 and SSB7 are included in the fourteenth slot, and transmission locations of SSB4 and SSB5 are included in the eighteenth slot. Then the network device may transmit SSB2 and SSB3 in the second and the twelfth slots, SSB1 in the sixth slot, SSB4 in the eighth and the eighteenth slots, and SSB7 in the fourteenth slot.

Further, within the period for the synchronization signal block transmission, the network device transmits the same synchronization signal block only once. In other words, if detecting the idle channel, the network device determines whether the first synchronization signal block is sent out within the period for the synchronization signal block transmission; and determines the target time domain transmission location of the first synchronization signal block within the channel occupancy time if the transmitting of the first synchronization signal block is not completed. As shown in FIG. 6, the network device occupies the second, the sixth, the eighth, the twelfth, the fourteenth, and the eighteenth slots in the 20 ms according to the detection result, where transmission locations of SSB2 and SSB3 are included in the second slot, transmission locations of SSB0 and SSB1 are included in the sixth slot, transmission locations of SSB4 and SSB5 are included in the eighth slot, transmission locations of SSB2 and SSB3 are included in the twelfth slot, transmission locations of SSB6 and SSB7 are included in the fourteenth slot, and transmission locations of SSB4 and SSB5 are included in the eighteenth slot. Then the network device performs transmission in the first transmission locations of SSB1, SSB2, SSB3, SSB4 and SSB7, that is, transmits SSB2 and SSB3 in the second slot, SSB1 in the sixth slot, SSB4 in the eighth slot, and SSB7 in the fourteenth slot. It should be noted that when the network device detects an idle channel, a start location and an end location of the maximum duration MCTO of channel occupancy may be aligned with a boundary of a subframe or slot, or may not be aligned with a boundary of a subframe or slot. FIG. 6 only takes the aligned scenario as an example for illustrative description.

In this embodiment of this disclosure, the first synchronization signal block carries indication information used to indicate a target time domain transmission location. That is, an actual transmitting location of an SSB is indicated by a physical channel or a physical signal in the SSB. For example, the target time domain transmission location of the first synchronization signal block is indicated by a bit in a PBCH in the SSB.

Further, the indication information includes at least one of the following:

first indication information used to indicate whether the target time domain transmission location is the default time domain transmission location of the first synchronization signal block, where the first indication information is used to indicate whether the first synchronization signal block is sent in its default time domain transmission location;

second indication information used to indicate time domain resources of the candidate time domain transmission locations of the first synchronization signal block, where the second indication information is used to indicate OFDM symbol, slot, subframe or frame numbers of the time domain resources in which all candidate time domain transmission locations of the first synchronization signal block are located;

third indication information used to indicate a time domain resource of the target time domain transmission location, where the third indication information is used to indicate an OFDM symbol, slot, subframe or frame number of a time domain resource in which the actual transmitting location of the first synchronization signal block is located; and fourth indication information used to indicate an offset between the target time domain transmission location and the default time domain transmission location of the first synchronization signal block. The offset indicated by the fourth indication information includes a time domain offset value and/or an index offset value of the synchronization signal block. In other words, the fourth indication information is used to indicate how many OFDM symbols, slots, subframes, half frames or frames the actual transmission location of the first synchronization signal block is offset relative to the default time domain transmission location; or, to indicate the transmission locations of how many SSB indexes the actual transmission location of the first synchronization signal block is offset relative to the default time domain transmission location.

In the synchronization signal block transmission method in this embodiment of this disclosure, the network device may transmit the synchronization signal block flexibly at different time points within a time period, avoiding the problem that the synchronization signal block cannot be sent due to missing out a transmitting time of the synchronization signal block, thereby improving effectiveness of communication.

The synchronization signal block transmission method in different scenarios is separately described in detail in the foregoing embodiment. An embodiment below further describes a network device corresponding to the method with reference to an accompanying drawing.

Figure 7:
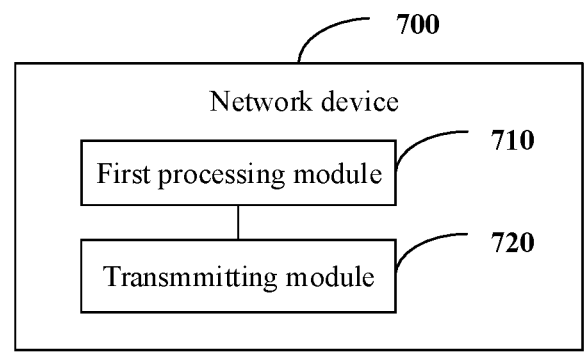
FIG. 7 is a schematic module structure diagram of a network device provided in an embodiment of this disclosure.

As shown in FIG. 7, a network device 700 in an embodiment of this disclosure can implement details of the method in the foregoing embodiment and achieve a same effect, that is, determining a target time domain transmission location of a first synchronization signal block within a downlink signal transmitting time, where the target time domain transmission location is one of at least two candidate time domain transmission locations of the first synchronization signal block; and transmitting the first synchronization signal block in the target time domain transmission location. The network device 700 specifically includes the following functional modules:

a first processing module 710, configured to determine a target time domain transmission location of a first synchronization signal block within a downlink signal transmitting time, where the target time domain transmission location is one of at least two candidate time domain transmission locations of the first synchronization signal block; and a transmitting module 720, configured to transmit the first synchronization signal block in the target time domain transmission location.

The candidate time domain transmission locations include a default time domain transmission location, and at least one extra time domain transmission location.

The extra time domain transmission location is at least one of default time domain transmission locations of other synchronization signal blocks within a group that the first synchronization signal block belongs to, where the group includes at least two synchronization signal blocks with different index numbers.

The extra time domain transmission location is one of time domain transmission locations other than default time domain transmission locations of all synchronization signal blocks.

The first processing module 710 includes:

a first determining submodule, configured to determine the target time domain transmission location of the first synchronization signal block within a channel occupancy time if an idle channel is detected within a period for a synchronization signal block transmission, where the transmitting period of the first synchronization signal block is N×5 ms, and N is a positive integer greater than 1.

The first determining submodule includes:

a first determining unit, configured to determine whether the first synchronization signal block is sent out within the period for the synchronization signal block transmission if the idle channel is detected; and a second determining unit, configured to determine the target time domain transmission location of the first synchronization signal block within the channel occupancy time if the transmitting of the first synchronization signal block is not completed.

The first synchronization signal block carries indication information used to indicate the target time domain transmission location.

The indication information includes at least one of the following:

first indication information used to indicate whether the target time domain transmission location is the default time domain transmission location of the first synchronization signal block;

second indication information used to indicate time domain resources of the candidate time domain transmission locations of the first synchronization signal block;

third indication information used to indicate a time domain resource of the target time domain transmission location; and fourth indication information used to indicate an offset between the target time domain transmission location and the default time domain transmission location of the first synchronization signal block.

The offset includes a time domain offset value and/or an index offset value of the synchronization signal block.

Optionally, in a 5 ms half frame, a number of a starting orthogonal frequency division multiplexing OFDM symbol of the target time domain transmission location is: $(2+14*n+14*5)$ or $(8+14*n+14*5)$, where $n=0, 1, 2, 3$.

It should be noted that, the network device in this embodiment of this disclosure can transmit the synchronization signal block flexibly at different time points within a time period, avoiding the problem that the synchronization signal block cannot be sent due to missing out a transmitting time of the synchronization signal block, thereby improving effectiveness of communication.

To better achieve the foregoing objective, an embodiment of this disclosure further provides a network device, including a processor, a memory, and a computer program stored in the memory and capable of running on the processor, where when the processor executes the computer program, the steps of the foregoing synchronization signal block transmission method are implemented.

An embodiment of this disclosure further provides a computer-readable storage medium, where the computer-readable storage medium stores a computer program, and when the computer program is executed by a processor, the steps of the foregoing synchronization signal block transmission method are implemented.

Figure 8:
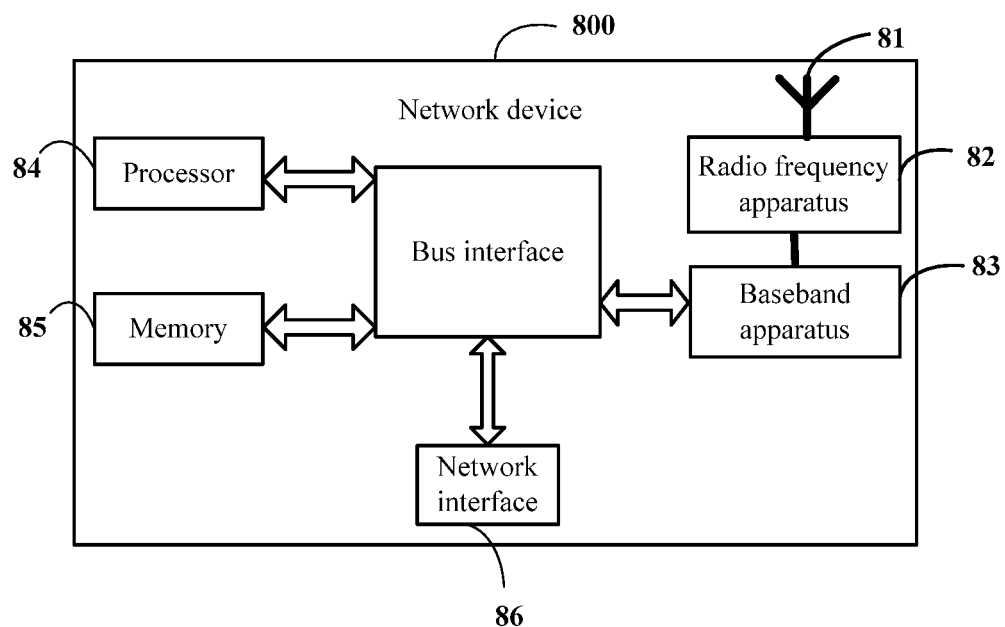
FIG. 8 is a block diagram of a network device provided in an embodiment of this disclosure.

Specifically, an embodiment of this disclosure further provides a network device. As shown in FIG. 8, the network device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and transmits the received information to the baseband apparatus 83 for processing. In a downlink direction, the baseband apparatus 83 processes to-be-sent information, and transmits the information to the radio frequency apparatus 82; and the radio frequency apparatus 82 processes the received information and then transmits the information out by using the antenna 81.

The method performed by the network device in the foregoing embodiment may be implemented in the baseband apparatus 83, and the baseband apparatus 83 includes a processor 84 and a memory 85.

The baseband apparatus 83 may include, for example, at least one baseband processing unit, where a plurality of chips are disposed on the baseband processing unit. As shown in FIG. 8, one of the chips is, for example, the processor 84, connected to the memory 85, to invoke the program in the memory 85 to perform the operation of the network device shown in the foregoing method embodiment.

The baseband apparatus 83 may further include a network interface 86, configured to exchange information with the radio frequency apparatus 82, where the interface is, for example, a common public radio interface (CPRI).

Herein, the processor may be one processor, or may be a collective term for a plurality of processing components. For example, the processor may be a CPU, or may be an ASIC, or is configured as one or more integrated circuits for implementing the method performed by the network device, for example, one or more microprocessors, or digital signal processors DSPs, or one or more field programmable gate arrays FPGAs. A storage component may be a memory, or may be a collective term for a plurality of storage components.

The memory 85 may be a volatile memory or a non-volatile memory, or may include a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), which is used as an external cache. By way of example but not restrictive description, many forms of RAMs may be used, for example, a static RAM (SRAM), a dynamic RAM (DRAM), a synchronous DRAM (SDRAM), a double data rate SDRAM (DDRS-DRAM), an enhanced SDRAM (ESDRAM), a synchlink DRAM (SLDRAM), and a direct Rambus RAM (DRRAM). The memory 85 described in this application is intended to include but is not limited to these and any other suitable types of memories.

Specifically, the network device in this embodiment of this disclosure further includes a computer program stored in the memory 85 and capable of running on the processor 84. The processor 84 invokes the computer program in the memory 85 to perform the method performed by each module shown in FIG. 7.

Specifically, the computer program, when being invoked by the processor 84, may be configured to determine a target time domain transmission location of a first synchronization signal block within a downlink signal transmitting time, where the target time domain transmission location is one of at least two candidate time domain transmission locations of the first synchronization signal block; and transmitting the first synchronization signal block in the target time domain transmission location.

The candidate time domain transmission locations include a default time domain transmission location, and at least one extra time domain transmission location.

The extra time domain transmission location is at least one of default time domain transmission locations of other synchronization signal blocks within a group that the first synchronization signal block belongs to, where the group includes at least two synchronization signal blocks with different index numbers.

The extra time domain transmission location is one of time domain transmission locations other than default time domain transmission locations of all synchronization signal blocks.

The computer program, when being invoked by the processor 84, may be configured to determine the target time domain transmission location of the first synchronization signal block within a channel occupancy time if an idle channel is detected within a period for a synchronization signal block transmission, where the transmitting period of the first synchronization signal block is N×5 ms, and N is a positive integer greater than 1.

The computer program, when being invoked by the processor 84, may be configured to determine whether the first synchronization signal block is sent out within the period for the synchronization signal block transmission if the idle channel is detected; and determine the target time domain transmission location of the first synchronization signal block within a channel occupancy time if the transmitting of the first synchronization signal block is not completed.

The first synchronization signal block carries indication information used to indicate the target time domain transmission location.

The indication information includes at least one of the following:

first indication information used to indicate whether the target time domain transmission location is the default time domain transmission location of the first synchronization signal block;

second indication information used to indicate time domain resources of the candidate time domain transmission locations of the first synchronization signal block;

third indication information used to indicate a time domain resource of the target time domain transmission location; and fourth indication information used to indicate an offset between the target time domain transmission location and the default time domain transmission location of the first synchronization signal block.

The offset includes a time domain offset value and/or an index offset value of the synchronization signal block.

Optionally, in a 5 ms half frame, a number of a starting orthogonal frequency division multiplexing OFDM symbol of the target time domain transmission location is: $(2+14*n+14*5)$ or $(8+14*n+14*5)$, where $n=0, 1, 2, 3$.

The network device may be a base transceiver station (BTS) in a global system of mobile communication (GSM) or code division multiple access (CDMA), or may be a NodeB (NB) in wideband code division multiple access (WCDMA), or may be an evolved NodeB (eNB or eNodeB), a relay station, or an access point in LTE, or may be a base station in a future 5G network, or the like, which is not limited herein.

The network device in this embodiment of this disclosure can transmit the synchronization signal block flexibly at different time points within a time period, avoiding the problem that the synchronization signal block cannot be sent due to missing out a transmitting time of the synchronization signal block, thereby improving effectiveness of communication.

The synchronization signal block transmission method in this disclosure is described from the network device side in the foregoing embodiment. An embodiment below further describes the synchronization signal block transmission method with reference to an accompanying drawing.

Figure 9:
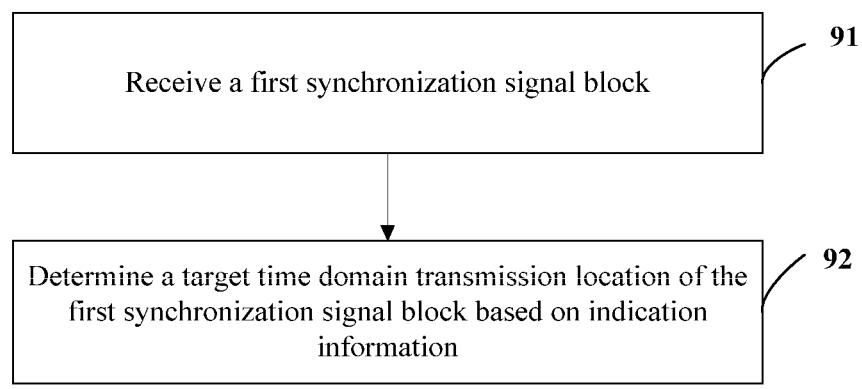
FIG. 9 is a schematic flowchart of a synchronization signal block transmission method on a terminal side provided in an embodiment of this disclosure.

As shown in FIG. 9, a synchronization signal block transmission method in an embodiment of this disclosure is applied to a terminal side, and includes the following steps.

Step 91: Receive a first synchronization signal block.

The first synchronization signal block carries indication information used to indicate the target time domain transmission location. That is, the indication information may be carried by a physical channel or a physical signal in an SSB to indicate an actual transmitting location of the SSB. For example, the target time domain transmission location of the first synchronization signal block is indicated by a bit in a PBCH in the SSB.

Step 92: Determine a target time domain transmission location of the first synchronization signal block based on the indication information.

The target time domain transmission location is one of at least two candidate time domain transmission locations of the first synchronization signal block. Within a downlink signal transmitting time, the network device selects one from the at least two candidate time domain transmission locations as the target time domain transmission location of the first synchronization signal block. Since there are a plurality of candidate time domain transmission locations available for selection, transmitting of the synchronization signal block by the network device is more flexible.

The candidate time domain transmission locations include a default time domain transmission location, and at least one extra time domain transmission location. The default time domain transmission location is the same as a time domain transmission location of the first synchronization signal block on a licensed frequency band.

Further, the extra time domain transmission location is a time domain transmission location used for transmitting the synchronization signal block other than the default time domain transmission location. The extra time domain transmission location may be at least one of default time domain transmission locations of other synchronization signal blocks within a group that the first synchronization signal block belongs to, where the group includes at least two synchronization signal blocks with different index numbers. Alternatively, the extra time domain transmission location is one of time domain transmission locations other than default time domain transmission locations of all synchronization signal blocks.

Step 92 includes: determining the target time domain transmission location of the first synchronization signal block within a period for a synchronization signal block transmission based on the indication information, where the period for the synchronization signal block transmission is $N \times 5$ ms, and N is a positive integer greater than 1. Within the period for the synchronization signal block transmission, all of the default time domain transmission locations of the first synchronization signal block within different SS burst sets (5 ms, for example, from a starting location of each 10 ms frame, or a duration of 5 ms starting from a starting location of a 5 ms half frame) are determined as the candidate time domain transmission locations of the first synchronization signal block. The network device may transmit in one SS burst set only part of to-be-sent SSBs indicated by system information or radio resource control (RRC) signaling, that is, it is not required that all to-be-sent SSBs be sent out within a 5 ms window.

It should be noted that the foregoing indication information includes at least one of the following:

first indication information used to indicate whether the target time domain transmission location is the default time domain transmission location of the first synchronization signal block, where the first indication information is used to indicate whether the first synchronization signal block is sent in its default time domain transmission location;

second indication information used to indicate time domain resources of the candidate time domain transmission locations of the first synchronization signal block; where the second indication information is used to indicate OFDM symbol, slot, subframe or frame numbers of the time domain resources in which all candidate time domain transmission locations of the first synchronization signal block are located;

third indication information used to indicate a time domain resource of the target time domain transmission location, where the second indication information is used to indicate an OFDM symbol, slot, subframe or frame number of a time domain resource in which the actual transmitting location of the first synchronization signal block is located; and fourth indication information used to indicate an offset between the target time domain transmission location and the default time domain transmission location of the first synchronization signal block.

The offset indicated by the fourth indication information includes a time domain offset value and/or an index offset value of the synchronization signal block.

Optionally, in a 5 ms half frame, a number of a starting orthogonal frequency division multiplexing OFDM symbol of the target time domain transmission location is: $(2+14*n+14*5)$ or $(8+14*n+14*5)$, where $n=0, 1, 2, 3$.

In the synchronization signal block transmission method in this embodiment of this disclosure, the synchronization signal block can be transmitted flexibly in different time points within a time period, avoiding the problem that the synchronization signal block cannot be sent due to missing out a transmitting time of the synchronization signal block, thereby improving effectiveness of communication.

The synchronization signal block transmission method in different scenarios is described in the foregoing embodiment. An embodiment below further describes a terminal corresponding to the method with reference to an accompanying drawing.

Figure 10:
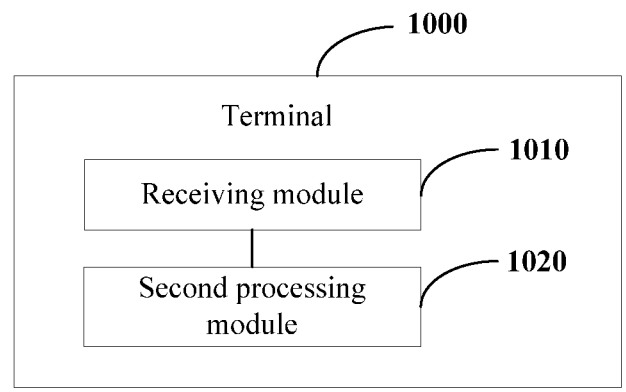
FIG. 10 is a schematic module structure diagram of a terminal provided in an embodiment of this disclosure.

As shown in FIG. 10, a terminal 1000 in an embodiment of this disclosure can implement details of the method in the foregoing embodiment and achieve a same effect, that is, receiving a first synchronization signal block, where the first synchronization signal block carries indication information used to indicate a target time domain transmission location; and determining the target time domain transmission location of the first synchronization signal block based on the indication information. The terminal 1000 specifically includes the following functional modules:

a receiving module 1010, configured to receive a first synchronization signal block, where the first synchronization signal block carries indication information used to indicate a target time domain transmission location; and a second processing module 1020, configured to determine the target time domain transmission location of the first synchronization signal block based on the indication information, where the target time domain transmission location is one of at least two candidate time domain transmission locations of the first synchronization signal block.

The candidate time domain transmission locations include a default time domain transmission location, and at least one extra time domain transmission location.

The extra time domain transmission location is at least one of default time domain transmission locations of other synchronization signal blocks within a group that the first synchronization signal block belongs to, where the group includes at least two synchronization signal blocks with different index numbers.

The extra time domain transmission location is one of time domain transmission locations other than default time domain transmission locations of all synchronization signal blocks.

The second processing module 1020 includes:

a second determining submodule, configured to determine the target time domain transmission location of the first synchronization signal block within a period for a synchronization signal block transmission based on the indication information, where the period for the synchronization signal block transmission is N×5 ms, and N is a positive integer greater than 1.

The indication information includes at least one of the following:

first indication information used to indicate whether the target time domain transmission location is the default time domain transmission location of the first synchronization signal block;

second indication information used to indicate time domain resources of the candidate time domain transmission locations of the first synchronization signal block;

third indication information used to indicate a time domain resource of the target time domain transmission location; and fourth indication information used to indicate an offset between the target time domain transmission location and the default time domain transmission location of the first synchronization signal block.

The offset includes a time domain offset value and/or an index offset value of the synchronization signal block.

Optionally, in a 5 ms half frame, a number of a starting orthogonal frequency division multiplexing OFDM symbol of the target time domain transmission location is: (2+14*n+14*5) or (8+14*n+14*5), where n=0, 1, 2, 3.

It should be noted that, in this embodiment of this disclosure, the synchronization signal block can be transmitted flexibly at different time points within a time period, avoiding the problem that the synchronization signal block cannot be sent due to missing out a transmitting time of the synchronization signal block, thereby improving effectiveness of communication.

It should be noted that, it should be understood that division of modules of the network device and the terminal is merely logical function division. The modules may be all or partially integrated in a physical entity or may be separated physically in an actual implementation. In addition, the modules may be all implemented in a form of software invoked by a processing component, or may be all implemented in a form of hardware; or a part of modules may be implemented in a form of software invoked by a processing component, and another part of modules may be implemented in a form of hardware. For example, a determining module may be a processing component that is separately disposed, or may be integrated in a chip of the apparatus for implementation. In addition, the determining module may be stored in the memory of the apparatus in a form of program code, and is invoked by a processing component of the apparatus to perform a function of the determining module. Implementation of other modules is similar to this. In addition, the modules may be all or partially integrated, or may be implemented independently. Herein, the processing component may be an integrated circuit, and has a signal processing capability. In an implementation process, steps in the foregoing method or the foregoing modules can be implemented by using a hardware integrated logical circuit in the processor component, or by using instructions in a form of software.

For example, the modules may be configured as one or more integrated circuits for implementing the foregoing method, for example, one or more application-specific integrated circuit (ASIC), or one or more microprocessors, or one or more digital signal processors (DSP), or one or more field programmable gate array (FPGA). For another example, when one of the foregoing modules is implemented in a form of program code invoked by the processing component, the processing component may be a general processor, for example, a central processing unit (CPU) or another processor that may invoke program code. For another example, the modules may be integrated and implemented in a form of a system-on-a-chip (SOC).

Figure 11:
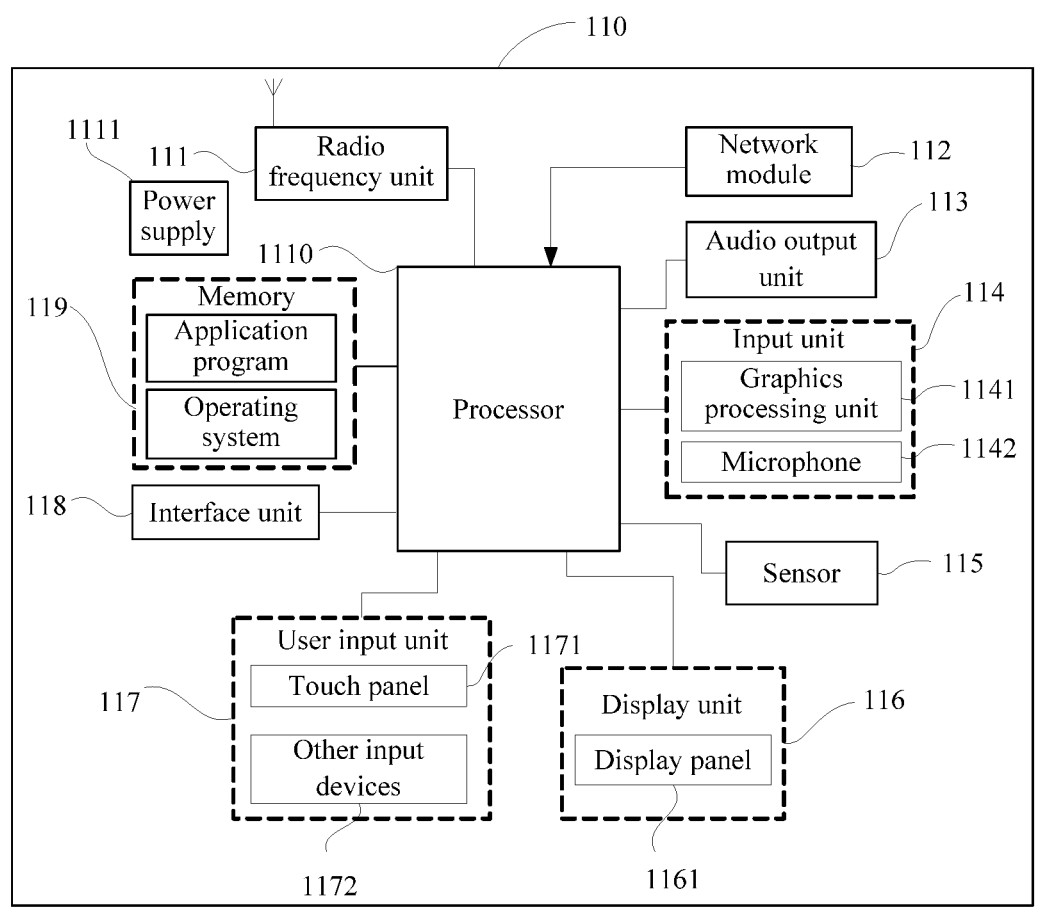
FIG. 11 is a block diagram of a terminal provided in an embodiment of this disclosure.

To better achieve the foregoing objective, further, FIG. 11 is a schematic diagram of a hardware structure of a terminal for implementing each embodiment of this disclosure. The terminal 110 includes but is not limited to components such as a radio frequency unit 111, a network module 112, an audio output unit 113, an input unit 114, a sensor 115, a display unit 116, a user input unit 117, an interface unit 118, a memory 119, a processor 1110, and a power supply 1111. A person skilled in the art may understand that the structure of the terminal shown in FIG. 11 does not constitute a limitation on the terminal. The terminal may be include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 111 is configured to receive a first synchronization signal block, where the first synchronization signal block carries indication information used to indicate a target time domain transmission location.

The processor 1110 is configured to determine the target time domain transmission location of the first synchronization signal block based on the indication information, where the target time domain transmission location is one of at least two candidate time domain transmission locations of the first synchronization signal block.

In this embodiment of this disclosure, the synchronization signal block can be transmitted flexibly at different time points within a time period, avoiding the problem that the synchronization signal block cannot be sent due to missing out a transmitting time of the synchronization signal block, thereby improving effectiveness of communication.

It should be understood that in this embodiment of this disclosure, the radio frequency unit 111 may be configured to receive and transmit signals in an information reception or transmission or call process. Specifically, after receiving downlink data from a base station, the radio frequency unit 111 transmits the downlink data to the processor 1110 for processing, and in addition, transmits uplink data to the base station. Generally, the radio frequency unit 111 includes but is not limited to an antenna, at least one amplifier, a transceiver, a coupler, a low noise amplifier, a duplexer, and the like. In addition, the radio frequency unit 111 may further communicate with a network and another device through a wireless communications system.

The terminal provides wireless broadband Internet access for a user by using the network module 112, for example, helps the user transmit and receive e-mails, browse web pages, and access streaming media.

The audio output unit 113 may convert audio data received by the radio frequency unit 111 or the network module 112 or stored in the memory 119 into an audio signal and output the audio signal as a sound. In addition, the audio output unit 113 may further provide audio output (for example, a call signal reception tone or a message reception tone) that is related to a specific function performed by the terminal 110. The audio output unit 113 includes a speaker, a buzzer, a telephone receiver, and the like.

The input unit 114 is configured to receive an audio or video signal. The input unit 114 may include a graphics processing unit (GPU) 1141 and a microphone 1142, and the graphics processing unit 1141 processes image data of a still picture or a video obtained by an image capture apparatus (for example, a camera) in an image capture mode or a video capture mode. A processed image frame may be displayed on the display unit 116. An image frame processed by the graphics processing unit 1141 may be stored in the memory 119 (or another storage medium) or sent by the radio frequency unit 111 or the network module 112. The microphone 1142 can receive a sound and can process the sound into audio data. The processed audio data can be converted into a format that can be sent to a mobile communication base station through the radio frequency unit 111 in a telephone call mode, for outputting.

The terminal 110 further includes at least one sensor 115, for example, an optical sensor, a motion sensor, and another sensor. Specifically, the optical sensor includes an ambient light sensor and a proximity sensor. The ambient light sensor may adjust brightness of a display panel 1161 based on intensity of ambient light. When the terminal 110 moves near an ear, the proximity sensor may disable the display panel 1161 and/or backlight. As a motion sensor, an accelerometer sensor may detect for a value of an acceleration in various directions (there are usually three axes), may detect for a value and a direction of gravity when the terminal is still, and may be configured to recognize a posture of the terminal (for example, landscape/portrait mode switching, a related game, or magnetometer posture calibration), provide a function related to vibration recognition (for example, a pedometer or a keystroke), or the like. The sensor 115 may further include a fingerprint sensor, a pressure sensor, an iris sensor, a molecular sensor, a gyroscope, a barometer, a hygrometer, a thermometer, or an infrared sensor. Details are not described herein.

The display unit 116 is configured to display information input by the user or information provided for the user. The display unit 116 may include the display panel 1161. The display panel 1161 may be configured in a form of a liquid crystal display (LCD), an organic light-emitting diode (OLED), or the like.

The user input unit 117 may be configured to receive input digit or character information, and generate key signal input related to user setting and function control of the terminal. Specifically, the user input unit 117 includes a touch panel 1171 and other input devices 1172. The touch panel 1171, also referred to as a touchscreen, may capture a touch operation performed by a user on or near the touch panel (for example, an operation performed by the user on the touch panel 1171 or near the touch panel 1171 by using any appropriate object or accessory such as a finger or a stylus). The touch panel 1171 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and transmits the point coordinates to the processor 1110, and receives and executes a command sent by the processor 1110. In addition, the touch panel 1171 may be implemented in a plurality of forms, for example, as a resistive, capacitive, infrared, or surface acoustic wave touch panel. The user input unit 117 may further include other input devices 1172 in addition to the touch panel 1171. Specifically, the other input devices 1172 may include but are not limited to a physical keyboard, a function key (such as a volume control key or a power on/off key), a trackball, a mouse, a joystick, and the like. Details are not described herein.

Further, the touch panel 1171 may cover the display panel 1161. After detecting a touch operation on or near the touch panel 1171, the touch panel 1171 transmits the touch operation to the processor 1110 to determine a type of a touch event. Then the processor 1110 provides corresponding visual output on the display panel 1161 based on the type of the touch event. In FIG. 11, the touch panel 1171 and the display panel 1161 serve as two independent components to implement input and output functions of the terminal. However, in some embodiments, the touch panel 1171 and the display panel 1161 may be integrated to implement the input and output functions of the terminal. This is not specifically limited herein.

The interface unit 118 is an interface for connecting an external apparatus to the terminal 110. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 118 may be configured to receive input (for example, data information and electric power) from the external apparatus, and transmit the received input to one or more elements in the terminal 110; or may be configured to transmit data between the terminal 110 and the external apparatus.

The memory 119 may be configured to store a software program and various data. The memory 119 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 119 may include a high-speed random access memory, or may further include a non-volatile memory, for example, at least one magnetic disk storage device, a flash memory device, or other volatile solid-state storage devices.

The processor 1110 is a control center of the terminal, connects various parts of the entire terminal by using various interfaces and lines, and executes various functions and data processing of the terminal by running or executing a software program and/or a module stored in the memory 119 and invoking data stored in the memory 119, so as to perform overall monitoring on the terminal. The processor 1110 may include one or more processing units. Optionally, the processor 1110 may integrate an application processor and a modem processor. The application processor mainly processes an operating system, a user interface, an application program, and the like. The modem processor mainly processes wireless communication. It may be understood that the modem processor may alternatively not be integrated into the processor 1110.

The terminal 110 may further include a power supply 1111 (for example, a battery) that supplies power to each component. Optionally, the power supply 1111 may be logically connected to the processor 1110 by using a power management system, so as to implement functions such as charging management, discharging management, and power consumption management by using the power management system.

In addition, the terminal 110 may include some functional modules that are not shown. Details are not described herein.

Optionally, an embodiment of this disclosure further provides a terminal, including a processor 1110, a memory 119, and a computer program stored in the memory 119 and capable of running on the processor 1110. When the computer program is executed by the processor 1110, the processes of the foregoing embodiments of the synchronization signal block transmission method are implemented, and a same technical effect can be achieved. To avoid repetition, details are not described herein again. The terminal may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a session initiated protocol (SIP) phone, a wireless local loop (WLL) station, or a personal digital assistant (PDA). The wireless terminal may also be referred to as a system, a subscriber unit, a subscriber station, a mobile station, a mobile terminal (Mobile), a remote station, a remote terminal, an access terminal, a user terminal, a user agent, or a user device or user equipment. This is not limited herein.

An embodiment of this disclosure further provides a computer-readable storage medium, where the computer-readable storage medium stores a computer program. When the computer program is executed by a processor, the processes of the foregoing embodiments of the synchronization signal block transmission method are implemented, and a same technical effect can be achieved. To avoid repetition, details are not described herein again. The computer-readable storage medium is, for example, a read-only memory (ROM), a random access memory (RAM), a magnetic disk, or an optical disk.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the prior art, or some of the technical solutions may be embodied in a form of a software product. The computer software product is stored in a storage medium, and includes several instructions for instructing a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

In addition, it should be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence, and some steps may be performed in parallel or independently. A person of ordinary skill in the art can understand that all or any steps or components of the method and apparatus in this disclosure may be implemented by hardware, firmware, software, or a combination thereof in any computing apparatus (including a processor, a storage medium, and the like) or a network of a computing apparatus. This can be implemented as long as a person of ordinary skill in the art applies basic programming skill after reading the specification of this disclosure.

Therefore, an objective of this disclosure may also be achieved by running a program or a group of programs on any computing apparatus. The computing apparatus may be a well-known general apparatus. Therefore, the objective of this disclosure may also be achieved by merely providing a program product including program code for implementing the method or apparatus. To be specific, the program product also constitutes this disclosure, and a storage medium storing the program product also constitutes this disclosure. Apparently, the storage medium may be any well-known storage medium or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence. Some steps may be performed in parallel or independently.

The foregoing descriptions are merely optional implementations of this disclosure. It should be noted that persons of ordinary skill in the art may make several improvements or polishing without departing from the principle of this disclosure and the improvements and polishing shall fall within the protection scope of this disclosure.

What is claimed is:

1. A synchronization signal block transmission method comprising:
   receiving, by a terminal, a first synchronization signal block, wherein the first synchronization signal block carries indication information used to indicate a target time domain transmission location; and
   determining, by the terminal, the target time domain transmission location of the first synchronization signal block based on the indication information, wherein the target time domain transmission location is one of at least two candidate time domain transmission locations of the first synchronization signal block,
   wherein the indication information comprises at least one of the following:
   information used to indicate time domain resources of the candidate time domain transmission locations of the first synchronization signal block;
   information used to indicate a time domain resource of the target time domain transmission location; or
   information used to indicate an offset between the target time domain transmission location and the default time domain transmission location of the first synchronization signal block.

2. The synchronization signal block transmission method according to claim 1, wherein the candidate time domain transmission locations comprise a default time domain transmission location, and at least one extra time domain transmission location.

3. The synchronization signal block transmission method according to claim 2, wherein the extra time domain transmission location is at least one of default time domain transmission locations of other synchronization signal blocks within a group that the first synchronization signal block belongs to, wherein the group comprises at least two synchronization signal blocks with different index numbers.

4. The synchronization signal block transmission method according to claim 2, wherein the extra time domain transmission location is one of time domain transmission locations other than default time domain transmission locations of all synchronization signal blocks.

5. The synchronization signal block transmission method according to claim 1, wherein the step of determining, by the terminal, the target time domain transmission location of the first synchronization signal block based on the indication information comprises:
   determining, by the terminal, the target time domain transmission location of the first synchronization signal block within a period for a synchronization signal block transmission based on the indication information, wherein the period for the synchronization signal block transmission is N×5 ms, and N is a positive integer greater than 1.

6. The synchronization signal block transmission method according to claim 1, wherein the indication information comprises:
   information used to indicate whether the target time domain transmission location is a default time domain transmission location of the first synchronization signal block.

7. The synchronization signal block transmission method according to claim 6, wherein the offset comprises a time domain offset value and/or an index offset value of the synchronization signal block.

8. The synchronization signal block transmission method according to claim 1, wherein in a 5 ms half frame, a number of a starting orthogonal frequency division multiplexing OFDM symbol of the target time domain transmission location is: (2+14*n+14*5) or (8+14*n+14*5), wherein n=0, 1, 2, 3.

9. A terminal, comprising a processor, a memory, and a computer program stored in the memory and capable of running on the processor, wherein the processor is configured to execute the computer program to:
   receive a first synchronization signal block, wherein the first synchronization signal block carries indication information used to indicate a target time domain transmission location; and
   determine the target time domain transmission location of the first synchronization signal block based on the indication information, wherein the target time domain transmission location is one of at least two candidate time domain transmission locations of the first synchronization signal block, wherein the indication information comprises at least one of the following:

information used to indicate time domain resources of the candidate time domain transmission locations of the first synchronization signal block;

information used to indicate a time domain resource of the target time domain transmission location; or information used to indicate an offset between the target time domain transmission location and the default time domain transmission location of the first synchronization signal block.

10. The terminal according to claim 9, wherein the candidate time domain transmission locations comprise a default time domain transmission location, and at least one extra time domain transmission location.

11. The terminal according to claim 10, wherein the extra time domain transmission location is at least one of default time domain transmission locations of other synchronization signal blocks within a group that the first synchronization signal block belongs to, wherein the group comprises at least two synchronization signal blocks with different index numbers.

12. The terminal according to claim 10, wherein the extra time domain transmission location is one of time domain transmission locations other than default time domain transmission locations of all synchronization signal blocks.

13. The terminal according to claim 9, wherein the processor is further configured to execute the computer program to:

determine the target time domain transmission location of the first synchronization signal block within a period for a synchronization signal block transmission based on the indication information, wherein the period for the synchronization signal block transmission is N×5 ms, and N is a positive integer greater than 1.

14. The terminal according to claim 9, wherein the indication information comprises:

information used to indicate whether the target time domain transmission location is a default time domain transmission location of the first synchronization signal block.

15. The terminal according to claim 9, wherein in a 5 ms half frame, a number of a starting orthogonal frequency division multiplexing OFDM symbol of the target time domain transmission location is: $(2+14*n+14*5)$ or $(8+14*n+14*5)$, wherein n=0, 1, 2, 3.

16. A network device, comprising a processor, a memory, and a computer program stored in the memory and capable of running on the processor, wherein the processor is configured to execute the computer program to:

determine a target time domain transmission location of a first synchronization signal block within a downlink signal transmitting time, wherein the target time domain transmission location is one of at least two candidate time domain transmission locations of the first synchronization signal block; and transmit the first synchronization signal block in the target time domain transmission location, wherein the indication information comprises at least one of the following:

information used to indicate time domain resources of the candidate time domain transmission locations of the first synchronization signal block;

information used to indicate a time domain resource of the target time domain transmission location; or information used to indicate an offset between the target time domain transmission location and the default time domain transmission location of the first synchronization signal block.

17. The network device according to claim 16, wherein the candidate time domain transmission locations comprise a default time domain transmission location, and at least one extra time domain transmission location.

18. The network device according to claim 17, wherein the extra time domain transmission location is one of time domain transmission locations other than default time domain transmission locations of all synchronization signal blocks.

19. The network device according to claim 16, wherein the first synchronization signal block carries indication information used to indicate the target time domain transmission location, wherein the indication information comprises:

information used to indicate whether the target time domain transmission location is a default time domain transmission location of the first synchronization signal block.

20. The network device according to claim 16, wherein in a 5 ms half frame, a number of a starting orthogonal frequency division multiplexing OFDM symbol of the target time domain transmission location is: $(2+14*n+14*5)$ or $(8+14*n+14*5)$, wherein n=0, 1, 2, 3.

* * * * *